Sept. 5, 1967   C. A. HUBERT ETAL   3,339,758
COMBINE GRAIN TANK LOADING AND UNLOADING SYSTEM
Filed Sept. 28, 1964   2 Sheets-Sheet 1
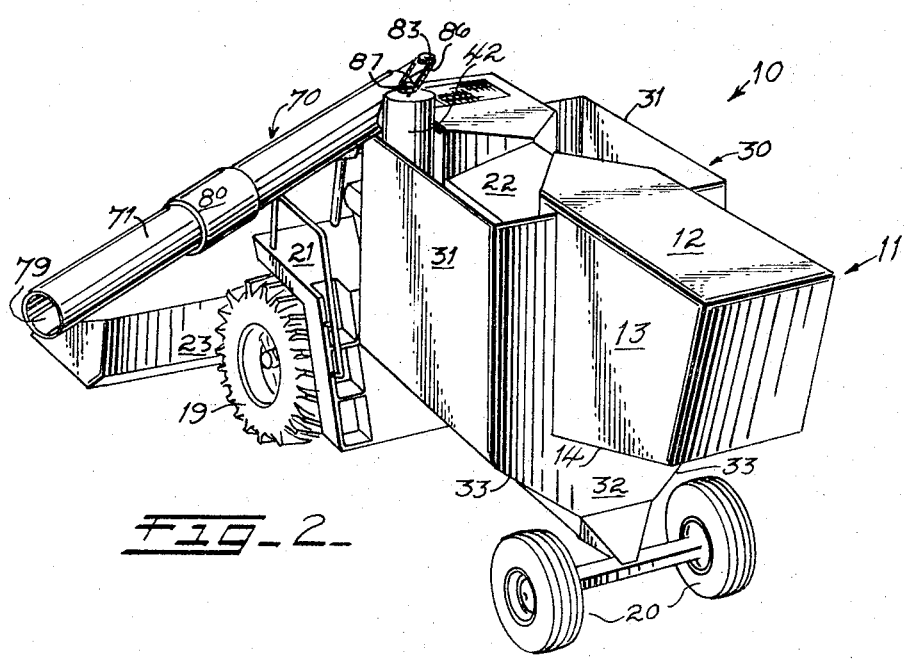
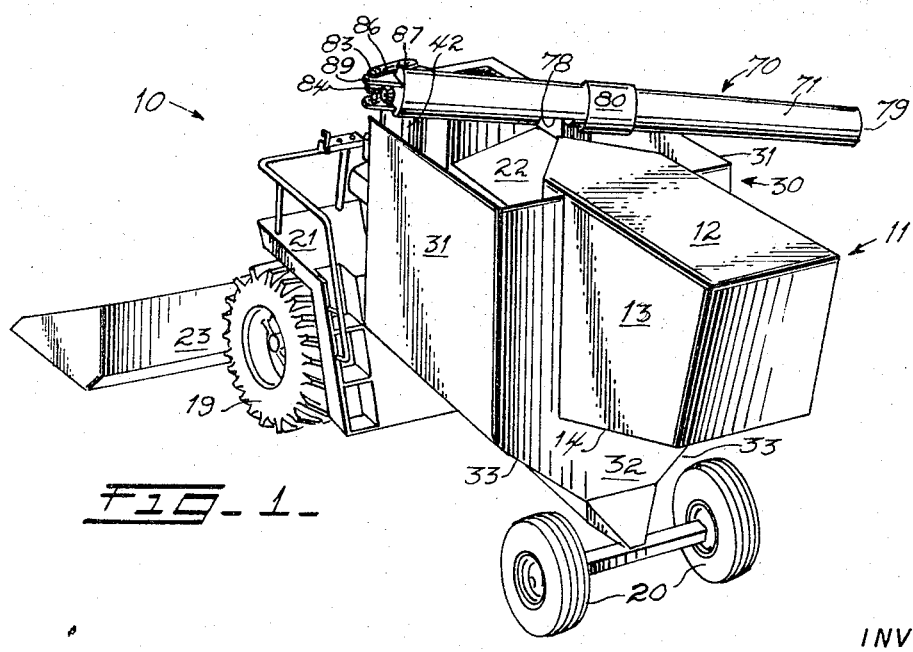
INVENTORS
CLARENCE A. HUBERT
JAMES R. McGIRK
BY
ATT'Y Sept. 5, 1967 C. A. HUBERT ETAL 3,339,758
COMBINE GRAIN TANK LOADING AND UNLOADING SYSTEM
Filed Sept. 28, 1964 2 Sheets-Sheet 2
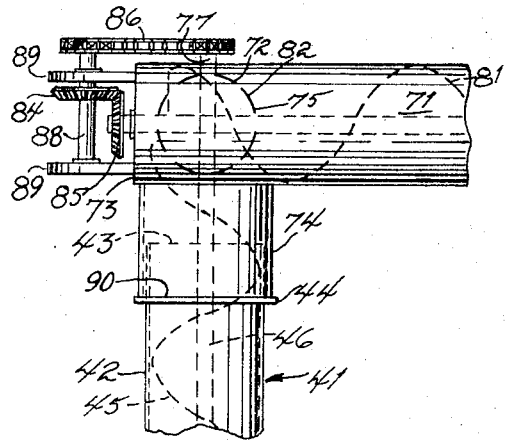
FIG-3-
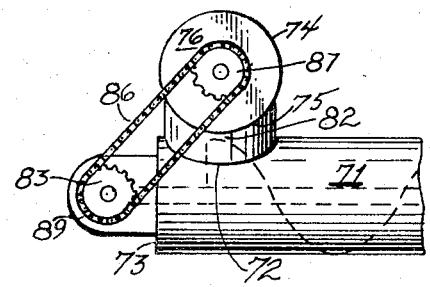
FIG-4-
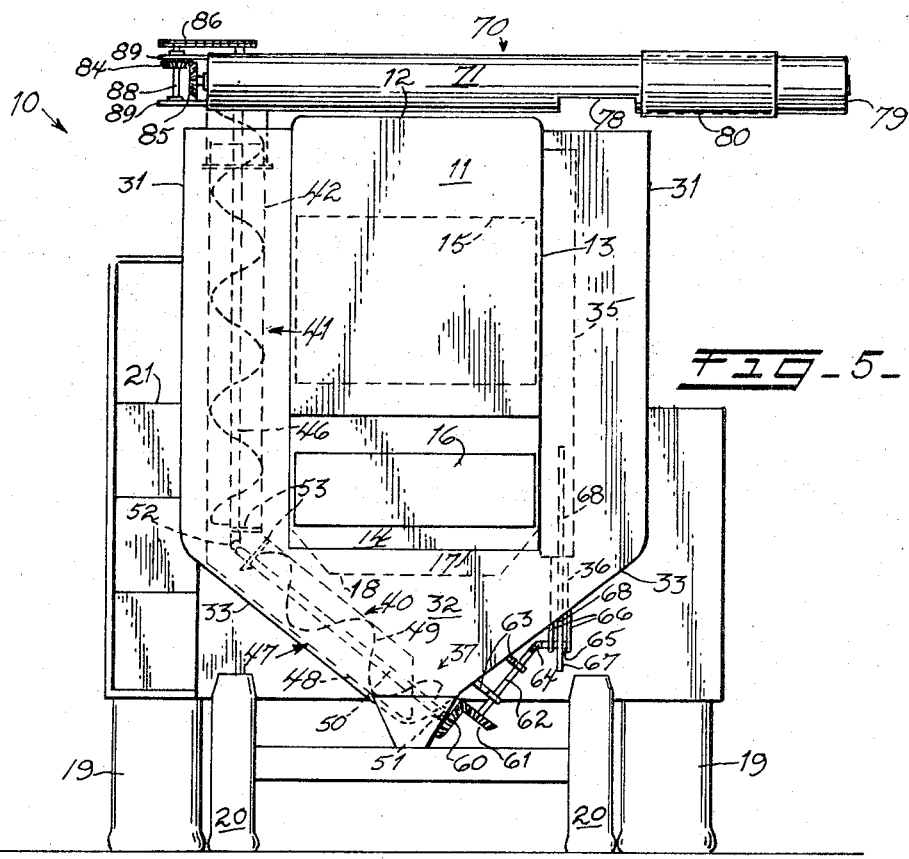
FIG-5-
INVENTORS
CLARENCE A. HUBERT
JAMES R. McGIRK
BY
ATT'Y United States Patent Office 3,339,758
Patented Sept. 5, 1967

3,339,758
COMBINE GRAIN TANK LOADING AND
UNLOADING SYSTEM
Clarence A. Hubert, Chicago, and James R. McGirk, Medinah, Ill., assignors to International Harvester Company, Chicago, Ill., a corporation of Delaware
Filed Sept. 28, 1964, Ser. No. 399,441
10 Claims. (Cl. 214—17)

The present invention relates generally to combines and the like and more particularly to a new and improved grain tank loading and unloading system.

In grain storage systems for combines it has been the general practice to elevate the grain from the bottom of the combine body and deposit it into the top of the combine grain storage tank. A separate unloading system was then provided to transfer the grain from the combine grain storage tank to a wagon or the like alongside the combine. Since the grain is often transferred from the combine grain storage tank during the harvesting operation it is necessary that both of these systems can operate simultaneously. Although systems such as this serve their purpose they are costly, add considerable weight to the combine, increase the overall dimensions of the combine, and require cumbersome driving mechanisms.

The general purpose of this invention is to provide a grain tank loading and unloading system which embraces all the advantages of similarly employed devices or systems and possesses none of the aforedescribed disadvantages. To obtain this, the present invention contemplates a unique U-shaped grain tank adapted to receive the harvested grain from the combine in its bight portion, a grain elevator adapted to raise grain from the bight portion of the U-shaped grain tank up through one of the legs of the grain tank, and a pivotally mounted grain distributor that is adapted to receive grain from said grain elevator, deposit it into either or both legs of the U-shaped grain tanks or into a receptacle, such as a wagon, alongside the combine.

An object of the present invention is the provision of a combine grain loading and unloading system that utilizes a single elevator for loading and unloading the grain storage tank.

Another object is to provide a combine with U-shaped grain storage tank that receives the harvested grain from the combine in its bottom or bight portion.

A further object of the invention is the provision of a combine grain loading and unloading system including a driving mechanism that is not exposed on or protruding from either side of the combine.

Still another object is to provide a combine having a U-shaped grain tank and a grain loading and unloading system having a single grain elevator.

Yet another object of the present invention is the provision of a combine having a U-shaped grain tank and a grain loading and unloading system that can deposit grain into either leg of the U-shaped grain tank.

These and other objects of the invention will become more apparent from the specification and drawings, wherein:

FIGURE 1 is a perspective view of a combine including applicants' invention having the grain distributing means in the loading position;

FIGURE 2 is a perspective drawing of a combine including applicants' invention having the distributing means in an unloading position;

FIGURE 3 is a detailed side view of the driving means for the grain elevator and distributor;

FIGURE 4 is a plan view of FIGURE 3;

FIGURE 5 is a rear view of a combine incorporating another embodiment of applicants' invention.

Referring now to the drawings wherein like reference characters designate like or corresponding parts throughout the several views there is shown, in FIGURE 1, a combine 10 having a threshing, separating and cleaning unit or body portion 11, drive wheels 19, dirigible wheels 20, operator's platform 21 and a harvesting head 23. The body portion 11 of the combine includes a top wall 12, a pair of sidewalls 13, and a bottom wall 14. As can be best seen in FIGURE 5, the body portion of the combine includes the threshing, separating and cleaning units such as the straw racks 15 and sieve and chaffer 16. A grain exit 17 is formed in the bottom wall 14 and includes means 18 for directing the clean grain into the bottom of the U-shaped tank.

The combine includes a U-shaped grain storage tank 30 having a pair of side sections or leg portions 31 interconnected by a bottom section or bight portion 32. As can be best seen in FIGURES 1 and 2, the bight portion 32 of the U-shaped tank is positioned beneath the bottom wall 14 of the combine body portion 11 and the leg portions 31 of the U-shaped grain tank extend upwardly along the sidewalls 13 of the combine body portion 11. The bottom section or bight portion 32 of the U-shaped grain storage tank is formed from inclined plates 33 that converge downwardly forming a nadir or lowest portion 37 of the grain storage tank. Thus it is seen that as grain is dropped into either leg portion of the grain storage tank it will encounter the inclined plates 33 and slide downwardly towards the nadir or lowest portion 37 of the storage tank. In FIGURE 5, a drive cavity 35 has been shown for receiving the driving mechanisms necessary for the threshing, separating and cleaning units. Also in this figure a shielding 36 is shown forming a passageway from the drive cavity 35 to the bottom of the grain storage tank for the passage of a belt or the like 68 for driving the grain elevator 40 which shall be described in greater detail.

The grain elevator 40 includes an upper portion 41 comprising a vertical tube 42 terminating in an upper edge 43, and having a horizontal shoulder 44 spaced below said edge 43 and protruding outwardly from the outer surface of tube 42. A vertical auger 45 having a core 46 is located within said vertical tube 42. The grain elevator 40 also includes a lower portion 47 comprising an inclined tube 48 which has mounted therein an inclined auger 49 having a core 50. The lower end of the core 50 is journalled in a bearing 51 carried by the bottom wall of the grain storage tank. A universal joint 52 connects the upper end of core 50 to the lower end of core 46. Adjacent this universal connection, there are provided bearings 53 for journalling cores 46 and 50. The upper end of core 46 is journalled in a bearing 77 which will be described in more detail. The grain elevator 40 can be driven by any well known driving mechanisms for example, as shown in FIGURE 5, the lower end of core 50 carries a level gear 60 that meshes with a second bevel gear 61 carried on a shaft 62. Means 63 are provided for journalling shaft 62 and a universal joint 64 is provided to connect shaft 62 to a second shaft 65 that is journalled on the bottom of the grain tank by means 66. The shaft 65 carries a sheave 67 that is driven by a belt 68 which in turn receives its driven motion from one of the conventional combine rotary elements such as the threshing cylinder. This drive system is disclosed merely as an example of one type that could be used and the invention is not intended to be limited hereby.

A grain distributing means or conveyor 70 is pivotally mounted upon the upper end of the grain elevator 40. The grain distributing means is made up of a horizontal tubular case or channel 71 having a side opening 72 located near one end and said one end being closed by a plate 73. The grain distributing means further includes a short vertical tube 74 having a side opening 75 that is connected through a duct 82 to the side opening 72. The short vertical tube 74 terminates in a lower horizontal edge 90 and is closed on the top by a plate 76 which carries a bearing 77. As previously mentioned bearing 77 functions as the journalling means for the upper end of core 46. The lower horizontal edge 90 of short vertical tube 74 rests on the shoulder 44 thus forming the limiting means for the pivotal connection between the grain distributor means 70 and the grain elevator 40. The horizontal tubular case or channel 71 is provided with a discharge opening 78 intermediate its ends and has an open free end 79. Means are provided for selectively controlling the size of the discharge opening such as an adjustable sleeve 80. The sleeve 80 can be slid along the tubular case 71 to a position as shown in FIGURE 1, wherein the discharge opening 78 is completely uncovered and all material flowing through tubular case 71 would be discharged through the discharge opening 78. The adjustable sleeve could also be positioned as is shown in FIGURE 2, wherein the discharge opening 78 is completely closed and material flowing through the horizontal tubular case 71 would then be discharged through the open free end 79. Conveying means such as an auger 81 extend through the entire length of the horizontal tubular case 71 and the core of the auger 81 extends outwardly of the tubular case through the plate 73 where it is rotated by means to be described.

Referring now to FIGURES 3 and 4, the upper end of core 46 carries a sprocket wheel 87 from which rotary motion is taken to rotate the conveying means 81. Brackets 89 are mounted on the plate 73 for journalling a shaft 88. The shaft 88 carries a sprocket wheel 83 that is aligned with the sprocket wheel 87 and is connected thereto by a chain 86. The shaft 88 carries a bevel gear 84 that cooperates with the bevel gear 85 carried by the core of the conveying means 81. Thus it is seen, as the sprocket wheel 87 carried by the core 46 of the grain elevator rotates, the rotary motion is transmitted through a chain 86 to the bevel gear 84 carried by the shaft 88 and the bevel gear 84 transfers the rotary motion to the conveying means 81 through the bevel gear 85. It should be understood that this drive system is intended to merely illustrate an example of a drive system that could be used and the invention disclosed herein is not intended to be limited thereby.

The grain after being processed through the threshing, separating and cleaning unit of the combine is discharged through the clean grain exit 17 and is directed by the means 18 into the bottom of the U-shaped grain storage tank. The grain then falls to the nadir or bottom of the U-shaped grain storage tank where it is picked up by the grain elevator 40 and raised upwardly to the grain discharging means 70. If it is desired to fill both legs of the grain storage tank, the grain distributing means 70 is then pivoted into the position as depicted in FIGURE 1 and the adjustable sleeve 80 is positioned such that the discharge opening is completely open. The grain then falls through the discharge opening downwardly where the deflector means 22 is encountered and the grain is divided between the two side sections of the U-shaped grain storage tank. Since the grain elevator is continuously picking up grain raising it and depositing it in the top of the grain storage tank a cavity into which the clean grain from the clean grain exit 17 can fall is thus kept open. The grain contained in the leg portions of the U-shaped grain storage tank is free to flow into the bight portion of the tank, however it will not fill to a horizonal level to prevent material falling out the clean grain exit 17 of the combine. The angle to the horizontal of the material flowing into the bight portion is called the material's angle of repose and is a function of the material's coefficient of friction. The angle of repose is the maximum angle to the horizontal that a pile of material such as grain will assume when not otherwise supported.

If for reasons of balance, or if one tank has inadvertently been filled faster than the other the adjustable sleeve 80 can be slid along the tubular case 70 to a position where the grain falls on only one side of the deflector means 22 to thus direct all grain to one or the other side sections of the U-shaped grain storage tank.

When the grain storage tanks are filled to capacity or for any other reason it is desired to empty it a truck or other receptacle is pulled along side the combine, the adjustable sleeve 80 is positioned to close the discharge opening 78, and the grain distributing means 70 is pivoted to a position as depicted in FIGURE 2. In this position of the grain distributing means 70, the grain is transmitted the entire length of the horizontal tubular case 71 and discharged through its open free end 79. This unloading operation can be carried out while the combine continues its harvesting operation and the conveying elements of the grain elevator 40 and the grain distributing means 70 continue to operate in the same manner as during the loading operation. When the unloading operation is completed the adjustable sleeve 80 is repositioned to its loading position and the horizontal tubular case 71 is pivoted back to the position as shown in FIGURE 1.

FIGURE 4 shows a second embodiment of applicants' invention in which the discharge opening 78 in the horizontal tubular case 71 is located such that the horizontal tubular case when pivoted to a position transverse to the longitudinal axis of the combine is located over one section 31 of the U-shaped grain tank and when pivoted into a position parallel to the longitudinal axis of the combine is located over the other section 31 of the U-shaped grain tank. In this embodiment the U-shaped grain tanks must have a longitudinal length at least as long as the distance between the pivot point of the horizontal tubular case 71 and the center of the discharge opening 78. This embodiment eliminates the need for the deflector means 22, of the embodiment shown in FIGURES 1 and 2.

It should be understood, of course, that the foregoing disclosure relates to only preferred embodiments of the invention and that numerous modifications or alterations may be made therein without departing from the spirit and the scope of the invention as set forth in the dependent claims.

What is claimed is:

1. In an agricultural harvesting machine the combination comprising; a longitudinally extending threshing, separating and cleaning unit, having a pair of side walls, a top wall and a bottom wall, a clean grain exit formed in said bottom wall; a generally U-shaped grain storage tank, the legs of said U-shaped tanks extending upwardly and parallel to said pair of side walls, the upper ends of said legs defining the upper edge of said U-shaped tank, and the bight portion of said generally U-shaped tank extending beneath said longitudinally extending threshing, separating and cleaning unit and forming the bottom of said U-shaped tank, said bottom of said U-shaped tank positioned such that said grain exit overlies said bight portion of said U-shaped tank; means directing the clean grain from said clean grain exit into the bottom of said U-shaped tank; means having an upper and lower portion for elevating grain from the bottom of said U-shaped tank up one of the tank's legs to the upper edge thereof; distributing means at the upper portion of said means for elevating grain that functions to either deposit grain selectively into the legs of the U-shaped tank or to deposit grain at a point alongside the harvesting machine.

2. The invention as set forth in claim 1 wherein the bight portion of said U-shaped tank includes bottom plates that converge downwardly forming a central nadir towards which the grain flows, and wherein the lower portion of said means for elevating grain is positioned such that it picks up grain from the nadir of said U-shaped tank.

3. The invention as set forth in claim 1 wherein said distributing means includes a portion that is pivotable in a generally horizontal plane, said portion having discharge openings formed therein through which grain is directed to either the U-shaped grain tank or a separate receptacle.

4. The invention as set forth in claim 2 wherein said distributing means includes a portion that is pivotable in a generally horizontal plane, said portion having discharge openings formed therein through which grain is directed to either the U-shaped grain tank or a separate receptacle.

5. The invention as set forth in claim 3 wherein said portion comprises a tubular case open at its free end, an auger conveyor extending through the entire length of said tubular case, an adjustable sleeve slidable on the exterior surface of said tubular case, and wherein one of said discharge openings is located intermediate the ends of said tubular case such that said adjustable sleeve functions to adjust the size of said discharge opening.

6. The invention as set forth in claim 4 wherein said portion comprises a tubular case open at its free end, an auger conveyor extending through the entire length of said tubular case, an adjustable sleeve slidable on the exterior surface of said tubular case, and wherein one of said discharge openings is located intermediate the ends of said tubular case such that said adjustable sleeve functions to adjust the size of said discharge opening.

7. The invention as set forth in claim 5 wherein the top wall of said threshing, separating and cleaning unit includes downwardly and outwardly diverging sections, and wherein said one discharge opening in said tubular case is located such that the tubular case can be pivotally adjusted relative to said downwardly and outwardly diverging sections such that the falling grain is directed by the diverging sections into both or either legs of said U-shaped grain tank.

8. The invention as set forth in claim 5 wherein said one discharge opening in said tubular case is located with respect to the threshing, separating and cleaning section and the U-shaped grain tank, such that when the tubular case is pivoted into a position transverse to the longitudinal axis of the harvesting machine said discharge opening is adapted to discharge grain into one leg of the U-shaped grain tank and when pivoted into a position parallel to the longitudinal axis of the harvesting machine it is adapted to discharge grain into the other leg of said U-shaped grain tank.

9. An agricultural harvesting machine including; a body portion enclosing grain threshing, separating and cleaning mechanisms; a grain tank including a pair of side sections extending down along opposite sides of the body and an interconnecting bottom section extending across the bottom of the body for temporary storing harvested grain received from the threshing, separating and cleaning mechanisms, characterized by; a grain discharge means for depositing harvested grain from the threshing, separating and cleaning mechanisms into the bottom section of the grain tank; a grain elevator for lifting the harvested grain from the bottom section through one of the side sections; grain distributing means for receiving grain from said grain elevator and selectively depositing the grain into either or both of said side sections or into a receptacle separate from the harvesting machine.

10. The invention as set forth in claim 9 wherein the distributing means is pivotable in a general horizontal plane and has a discharge opening formed therein through which grain is directed to either or both of said side sections and wherein said distributing means also includes an open end opposite the end at which it is pivoted through which grain is directed to a receptacle exterior of the harvesting machine.

References Cited
UNITED STATES PATENTS

| | | | |
|---|---|---|---|
| 1,615,334 | 1/1927 | MacGregor | 56—473.5 |
| 2,627,356 | 2/1953 | Bell | 214—17 |
| 2,998,152 | 8/1961 | Wognum et al. | 214—522 |
| 3,108,703 | 10/1963 | Horne et al. | 214—17 X |

GERALD M. FORLENZA, *Primary Examiner.*

ROBERT G. SHERIDAN, *Examiner.*